US012096317B2

(12) United States Patent
Bond et al.

(10) Patent No.: US 12,096,317 B2
(45) Date of Patent: *Sep. 17, 2024

(54) SYSTEM FOR COMMUNICATING FLEET-SPECIFIC FEATURES OF AN IMMEDIATE VEHICLE TO A PERSONAL ELECTRONIC DEVICE

(71) Applicant: GM Global Technology Operations LLC, Detroit, MI (US)

(72) Inventors: Jacob Alan Bond, Rochester Hills, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 346 days.

This patent is subject to a terminal disclaimer.

(21) Appl. No.: 17/572,954

(22) Filed: Jan. 11, 2022

(65) Prior Publication Data

US 2023/0219594 A1    Jul. 13, 2023

(51) Int. Cl.
*G08G 1/00*     (2006.01)
*G06Q 30/02*    (2023.01)
*G06Q 50/40*    (2024.01)
*H04W 4/40*     (2018.01)

(52) U.S. Cl.
CPC .............. *H04W 4/40* (2018.02); *G06Q 30/02* (2013.01); *G06Q 50/40* (2024.01); *G08G 1/20* (2013.01); *B60W 2420/403* (2013.01)

(58) Field of Classification Search
CPC ......... H04W 4/40; H04W 4/02; H04W 4/023; H04W 4/80; H04W 76/10; G06V 20/58; G08G 1/00; G08G 1/20; G06Q 30/20; G06Q 50/40; B60W 60/00; B60W 60/001; B60W 2420/42; B60W 2420/403
See application file for complete search history.

(56) References Cited

U.S. PATENT DOCUMENTS 8,315,617 B2 * 11/2012 Tadayon ............... H04W 4/025
                                                 455/418
10,172,145 B2 *  1/2019 Hazebrouck ...... H04M 1/72415

* cited by examiner

*Primary Examiner* — Tuan H Nguyen
(74) *Attorney, Agent, or Firm* — Vivacqua Crane, PLLC

(57) ABSTRACT

A system for communicating fleet-specific features to one or more personal electronic devices includes one or more controllers in wireless communication with a centralized computer system including one or more databases for storing the fleet-specific features. The one or more controllers execute instructions to undergo a passive wireless interaction with the one or more personal electronic devices. The passive wireless interaction involves determining the one or more personal electronic devices are located within a predefined proximity around a vehicle without human interaction. In response to undergoing the passive wireless interaction, the one or more controllers transmit one or more fleet-specific features to the one or more personal electronic devices, wherein the one or more fleet-specific features are shared by a fleet of vehicles, where the fleet of vehicles include an immediate vehicle and a group of vehicles that share one or more common attributes.

20 Claims, 2 Drawing Sheets

SYSTEM FOR COMMUNICATING FLEET-SPECIFIC FEATURES OF AN IMMEDIATE VEHICLE TO A PERSONAL ELECTRONIC DEVICE

INTRODUCTION

The present disclosure relates to a system for communicating fleet-specific features of an immediate vehicle to one or more personal electronic devices, where the fleet includes the immediate vehicle and a group of vehicles that share one or more common attributes Vehicles are equipped with a number of different features and options. As a results, consumers may select a specific vehicle based on one or more attributes of the vehicle based on their own needs and preferences. Furthermore, instead of owning a vehicle, many users nowadays may rent a vehicle or partake in a vehicle-sharing or ride sharing arrangements instead. However, a user may not be familiar with the specific features and capabilities of a particular vehicle. This may be especially true if an individual commonly rents or partakes in vehicle-sharing arrangements instead of owning his or her own vehicle.

In addition to the above-mentioned challenges, some users may be apprehensive of using a shared or rented vehicle because of a number of reasons. For example, a user may be apprehensive about operating a shared vehicle if they are not aware of the vehicle's sanitation status. That is, users may be apprehensive about driving a vehicle if they are not aware of a specific sanitization schedule for the particular vehicle. As another example, users might be apprehensive about using an autonomous vehicle if they are not aware of statistics regarding automated miles driven for a vehicle's particular make or manufacturer.

Thus, while current vehicles achieve their intended purpose, there is a need in the art for an approach that informs users of various features of a vehicle.

SUMMARY

According to several aspects, a system for communicating fleet-specific features of a vehicle to one or more personal electronic devices is disclosed. The system includes one or more controllers in wireless communication with a centralized computer system including one or more databases for storing the fleet-specific features. The one or more controllers execute instructions to undergo a passive wireless interaction with the one or more personal electronic devices. The passive wireless interaction involves determining the one or more personal electronic devices are located within a predefined proximity around the vehicle without human interaction. In response to undergoing the passive wireless interaction, the one or more controllers transmit one or more fleet-specific features to the one or more personal electronic devices, where the one or more fleet-specific features are shared by a fleet of vehicles, and the fleet of vehicles include an immediate vehicle and a group of vehicles that share one or more common attributes.

In an aspect, the passive wireless interaction includes establishing wireless communication between the one or more controllers and the one or more personal electronic devices based on a short-range communications protocol.

In another aspect, the predefined proximity is a communication range of the short-range communications protocol that connects the one or more controllers and the personal electronic device to one another.

In yet another aspect, the short-range communications protocol is set by the Institute of Electrical and Electronics Engineers, Inc. (IEEE) 802.xx standards.

In an aspect, the one or more common attributes include one or more of the following: vehicle origin, functionality, and a common entity that controls the fleet of vehicles.

In another aspect, the vehicle origin includes one or more of the following: a make, a model, or mobility company that provides autonomous software for the immediate vehicle.

In an aspect, the passive wireless interaction includes sensing the vehicle and the personal electronic device are within the predefined proximity of one another based on proximity sensing.

In yet another aspect, the proximity sensing includes receiving coordinates indicating a location of the one or more personal electronic devices, determining a distance between the personal electronic device and the vehicle based on the coordinates of the personal electronic device, and comparing the distance between the personal electronic device and the vehicle and the predefined proximity.

In an aspect, the fleet-specific features include one or more of the following: explanatory videos and information, statistics regarding automated miles driven for a particular make or manufacturer of the vehicle, cleaning and sanitization schedules, environmental responsibility statistics, and available accessibility features.

In an aspect, a system for communicating fleet-specific features of a vehicle is disclosed. The system including one or more personal electronic devices in wireless communication with a centralized computer system including one or more databases for storing the fleet-specific features, where the one or more personal electronic devices each include one or more controllers executing instructions to undergo an active wireless interaction with the one or more information transmission objects, where the active wireless interaction involves determining the personal electronic device is located within a predefined proximity around the vehicle based on a deliberate action by an individual. In response to undergoing the active wireless interaction, the centralized computer transmits one or more fleet-specific features to the one or more personal electronic devices, where the one or more fleet-specific features are shared by a fleet of vehicles, and the fleet of vehicles include an immediate vehicle and a group of vehicles that share one or more common attributes.

In another aspect, the deliberate action is an individual scanning a symbol by a camera of a personal electronic device.

In yet another aspect, the symbol identifies the fleet that includes the immediate vehicle.

In an aspect, the symbol identifies a corresponding vehicle identification number (VIN) of the immediate vehicle.

In another aspect, the symbol is disposed along an exterior or interior surface of the vehicle.

In an aspect, the symbol is a decal disposed along a passenger window of the vehicle.

In another aspect, the symbol is displayed by a screen located within an interior cabin of the vehicle.

In an aspect, the deliberate action is placing a personal electronic device in proximity to an inductively coupled reader tag mounted on the vehicle to initiate a connection.

In another aspect, the one or more common attributes include one or more of the following: vehicle origin, functionality, and a common entity that controls the fleet of vehicles.

In yet another aspect, the vehicle origin includes one or more of the following: a make, a model, or mobility company that provides the autonomous software for the immediate vehicle.

In an aspect, the fleet-specific features include one or more of the following: explanatory videos and information, statistics regarding automated miles driven for a particular make or manufacturer of the vehicle, cleaning and sanitization schedules, environmental responsibility statistics, and available accessibility features.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
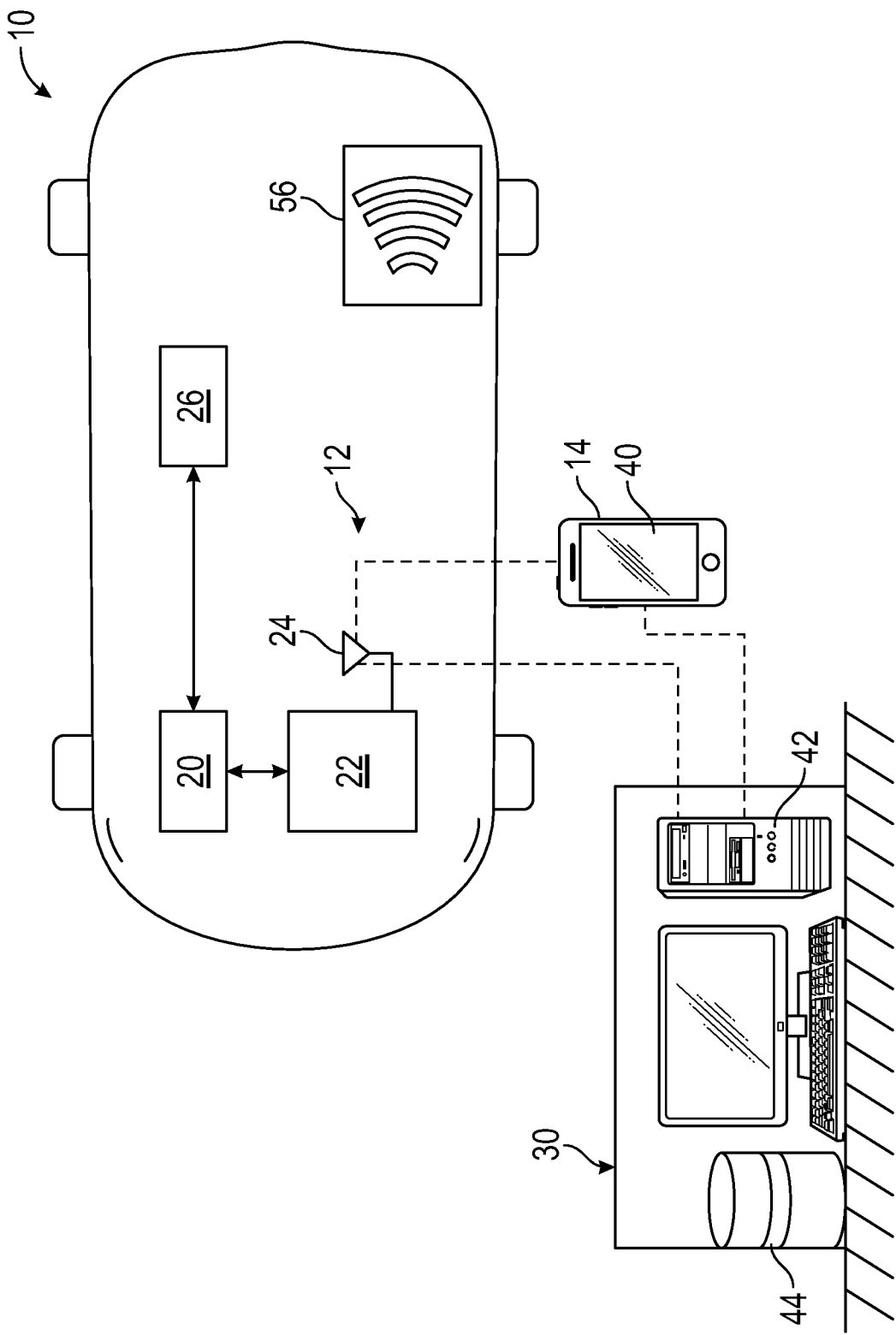
FIG. 1 is a schematic diagram of an exemplary vehicle including the disclosed system for communicating fleet-specific features to one or more personal electronic devices, according to an exemplary embodiment.

Referring to FIG. 1, an exemplary vehicle 10 including the disclosed system 12 is shown. The system 12 communicates fleet-specific features of the vehicle 10 to one or more personal electronic devices 14 that are within a predefined proximity to the vehicle 10. The vehicle 10 may be any type of vehicle such as, but not limited to, a sedan, truck, sport utility vehicle, van, or motor home. In an embodiment, the vehicle 10 is an autonomous or semi-autonomous vehicle, however, it is to be appreciated that a vehicle manually driven by an individual may be used as well. As explained below, the fleet-specific features of the vehicle 10 are shared by a fleet of vehicles, where the fleet of vehicles include an immediate vehicle (i.e., the vehicle 10) and a group of vehicles that share one or more common attributes. The one or more common attributes are described below, but include attributes such as such as, for example, vehicle origin (e.g., a make or model), functionality (e.g., wireless charging), or by a common entity that controls the fleet of vehicles (e.g., a rental car company). The disclosed system 12 includes one or more controllers 20 in electronic communication with one or more transceivers 22, an antenna 24, and one or more vehicle systems 26. The one or more transceivers 22 and antenna 24 wirelessly connect the one or more controllers 20 of the vehicle 10 with a back-end office 30 as well as the personal electronic device 14.

As explained below, the system 12 transmits the fleet-specific features in response to undergoing either a passive wireless interaction or an active wireless interaction with the personal electronic device 14. Specifically, a passive wireless interaction involves determining the personal electronic device 14 is located within the predefined proximity around the vehicle 10 without human interaction, and involves establishing wireless communication with the personal electronic device 14 based on a short-range communications protocol or, alternatively, by proximity sensing, which are both described below. In contrast, an active wireless interaction involves determining the personal electronic device 14 is located within the predefined proximity around the vehicle 10 based on a deliberate action by an individual. For example, as explained below, in an embodiment the active wireless interaction may involve an individual scanning a symbol 32 (seen in FIG. 2), where the symbol 32 is a specialized image that identifies the specific identity of the vehicle 10.

The fleet includes the immediate vehicle (e.g., the vehicle 10) in combination with one or more addition vehicles that include the common attributes, where the one or more common attributes that are applicable to the fleet are applied in a number of ways. In an embodiment, two or more common attributes are combined together to create a subcategory of vehicle that are part of a main common attribute. For example, the main category may be the common entity that controls the fleet of vehicles such as, for example, a rental car company (e.g., Hertz), and the subcategory is a common vehicle origin (e.g., all vehicles manufactured by General Motors Company). In an embodiment, a user may select the one or more common attributes by one or more user interfaces 40 that are part of the personal electronic device 14. However, it is to be appreciated that in another approach the one or more attributes of the fleet of vehicles are predefined, and a user may not be able to select the common attributes. In a further embodiment, a user may locate vehicles within a predefined distance of the immediate vehicle that are part of the group of vehicles. For example, a user may decide to search for all vehicles manufactured by General Motors Company that include wireless charging within a predefined distance (e.g., all vehicles manufactured by General Motors Company that include wireless charging within five kilometers).

The personal electronic device 14 may be any type of communication device for transmitting and receiving data that includes one or more user interfaces 40 for conveying information to a user. In the example as shown in FIG. 1, the user interface 40 is a touchscreen, however, it is to be appreciated that other devices may be used as well such as, for example, a speaker. For example, the personal electronic device 14 may be a smartphone or laptop computer. The one or more vehicle system 26 may be any vehicle system or subsystem for communicating information related to operation of the vehicle 10 to the one or more controllers 20 such as, for example, artificial intelligence systems, automated driving systems such as advanced driver-assistance systems (ADAS), a heating, ventilation, and air conditioning (HVAC) system, propulsion system, energy storage system, or driver monitoring system.

The passive wireless interaction with the personal electronic device 14 shall now be described. Specifically, in an embodiment, the passive wireless interaction includes establishing wireless communication between the one or more controllers 20 of the vehicle 10 and the personal electronic device 14 based on a short-range communications protocol. The wireless communication is established when the personal electronic device 14 is within the predefined proximity around the vehicle 10. In an embodiment, the predefined proximity is the communication range of a specific short-range communications protocol that connects the one or more controllers 20 of the vehicle 10 and the personal electronic device 14 to one another. In one non-limiting embodiment, the short-range communications protocol is set by the Institute of Electrical and Electronics Engineers, Inc. (IEEE) 802.xx standards.

In one example, the short-range communications protocol is a wireless local area network (wireless LAN, also referred to as Wi-Fi or the IEEE 802.11 standard) and the communication range is about forty-five meters to about ninety meters, depending upon the environment. Thus, the predefined proximity is about forty-five meters to about ninety meters, depending upon the environment. In another example, the short-range communications protocol is based on IEEE 802.15.1, and the communication range is about ten meters.

In response to determining the short-range wireless communication is established between the one or more controllers 20 of the vehicle 10 and the personal electronic device 14, the one or more controllers 20 of the system 12 retrieve the fleet-specific features indicating the characteristics of the vehicle 10 from one or more centralized computers 42 that are part of the back-end office 30. As seen in FIG. 1, the centralized computers 42 include one or more databases 44 for storing the fleet-specific features indicating the characteristics of the vehicle 10.

The fleet-specific features indicating the characteristics of the vehicle 10 are then transmitted to the personal electronic device 14. In response to receiving the fleet-specific features, the personal electronic device 14 conveys the fleet-specific features by the user interface 40. For example, in an embodiment, if the user interface 40 is a touchscreen, then the personal electronic device 14 conveys the fleet-specific features by displaying information related to the fleet-specific features on the touchscreen. Alternatively, in another example, the user interface 40 may be a speaker or other audio device for conveying the fleet-specific features by sound.

In another embodiment, the passive wireless interaction includes sensing the one or more controllers 20 of the vehicle 10 and the personal electronic device 14 are within the predefined proximity of one another based on proximity sensing. In proximity sensing, the one or more controllers 20 receive coordinates indicating a location of the personal electronic device 14. For example, in an embodiment, the coordinates indicating the location of the personal electronic device 14 are global navigation satellite system (GNSS) coordinates. The one or more controllers 20 determine a distance between the personal electronic device 14 and the vehicle 10 based on the coordinates of the personal electronic device 14 and compare the distance between the personal electronic device 14 and the vehicle 10 and the predefined proximity. In the present example, instead of being based on a specific short-range communications protocol, the predefined proximity simply indicates the personal electronic device 14 is within a predefined distance range of the vehicle 10. In response to determining the distance between the personal electronic device 14 and the vehicle 10 is equal to or less than the predefined proximity, the one or more controllers 20 retrieve the fleet-specific features indicating the characteristics of the vehicle 10 from one or more centralized computers 42 that are part of the back-end office 30. In an alternative embodiment, the one or more controllers 20 includes the phone controllers 46, where the phone controllers 46 retrieve the fleet-specific features from one or more centralized computers 42.

Figure 3:
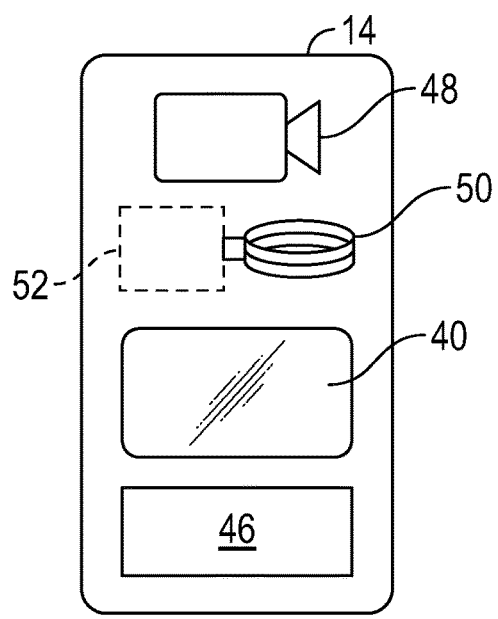
FIG. 3 is a schematic diagram of the personal electronic device, according to an exemplary embodiment.

The active wireless interaction with the personal electronic device 14 shall now be described. Specifically, the active wireless interaction includes determining the personal electronic device 14 is within the predefined proximity of the vehicle 10 in response to detecting a deliberate action performed by an individual. FIG. 3 is a schematic diagram of the personal electronic device 14 including the user interface 40, one or more controllers 46, a camera 48, one or more antennas 50, and communication circuitry 52 coupled to the antenna 50 for inductive coupling communication. The one or more controllers 46 of the personal electronic device 14 are in electronic communication with the user interface 40, the camera 48, and the communication circuitry 52.

Figure 2:
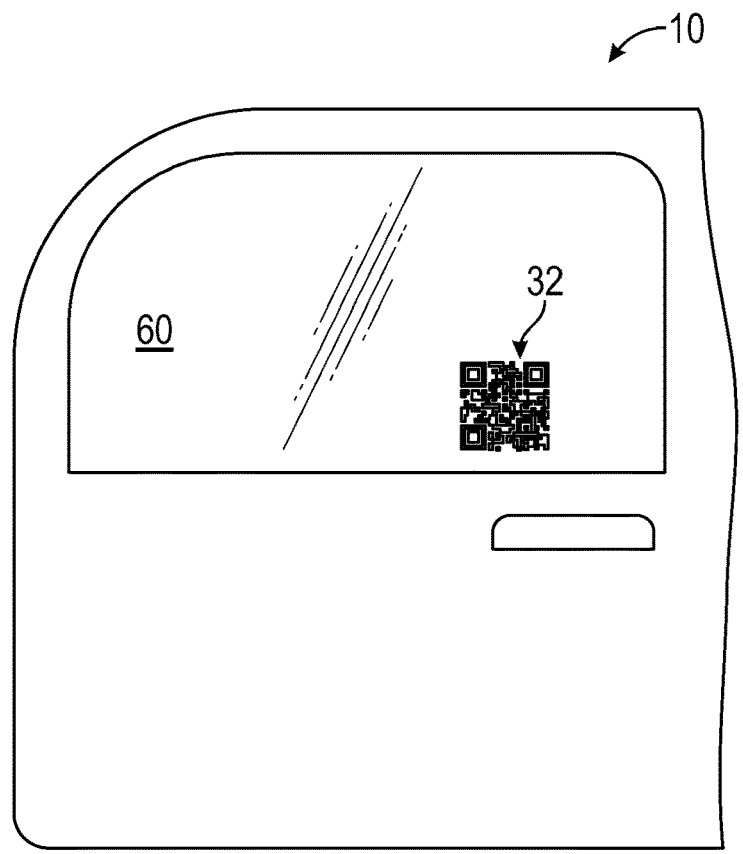
FIG. 2 illustrates an exemplary symbol that is a quick response (QR) code disposed on a window of the vehicle, according to an exemplary embodiment.

Referring to FIGS. 1-3, in an embodiment the deliberate action is an individual scanning the symbol 32 by the camera 48 of the personal electronic device 14. The one or more controllers 46 of the personal electronic device 14 undergoes the active wireless interaction with one or more information transmission objects. In an embodiment, the one or more information transmission objects include the symbol 32, where the symbol 32 is a specialized image that identifies the fleet including the immediate vehicle (e.g., the vehicle 10). In another embodiment, the symbol 32 identifies the immediate vehicle by a corresponding vehicle identification number (VIN). In the non-limiting embodiment as shown in FIG. 2, the symbol 32 is a quick response (QR) code disposed along a passenger window 60 of the vehicle 10, however, FIG. 2 is merely exemplary in nature and the symbol 32 is not limited to a QR code. In another example, the symbol 32 may be another customized barcode or image that is scannable by the camera of the personal electronic device 14 such as, but not limited to, an augmented reality University of Cordoba (ArUco) code. Although FIG. 2 also illustrates the symbol 32 as a decal disposed along a passenger window 60 of the vehicle 10, it is to be appreciated that the symbol 32 is disposed along any exterior or interior surface of the vehicle 10 as well. Moreover, although FIG. 2 illustrates the symbol 32 as being printed on a sticker or decal, in another embodiment the symbol 32 is displayed by a screen located within the interior cabin of the vehicle 10. Specifically, during vehicle start-up, the one or more controllers 20 instruct a screen to display the symbol 32.

The camera 48 of the personal electronic device 14 sends image data representative of the symbol 32 to the one or more controllers 46 of the personal electronic device 14. The one or more controllers 46 of the personal electronic device 14 decodes the symbol 32. As mentioned above, the symbol 32 may identify either the fleet that includes the immediate vehicle or, alternatively, the corresponding VIN of the immediate vehicle. In the event the symbol 32 identifies the fleet the immediate vehicle belongs to, then the one or more controllers retrieve the fleet-specific features indicating the characteristics of the vehicle 10 from the centralized computers 42 that are part of the back-end office 30. The fleet-specific features indicating the characteristics of the vehicle 10 are then conveyed to a user by the one or more user interfaces 40. For example, the fleet-specific features may be shown upon a touchscreen or display.

Alternatively, if the symbol 32 identifies the corresponding VIN of the immediate vehicle, then the one or more controllers 20 compares the common attributes that are applicable to the immediate vehicle with the one or more common attributes of the fleet of vehicles. As mentioned above, the one or more common attributes may be selected by a user or, in the alternative, the one or more attributes of the fleet of vehicles are predefined. In response to determining the common attributes of the immediate vehicle match the one or more common attributes of the fleet of vehicles, then the one or more controllers retrieve the fleet-specific features indicating the characteristics of the vehicle 10 from the centralized computers 42 that are part of the back-end office 30. The fleet-specific features indicating the characteristics of the vehicle 10 are then conveyed to a user by the one or more user interfaces 40.

Continuing to refer to FIGS. 1-3, in another embodiment the one or more information transmission objects include an inductively coupled reader tag 56 mounted on the vehicle 10, and the deliberate action is an individual placing the personal electronic device 14 in proximity to an inductively coupled reader tag 56 mounted on the vehicle 10 to initiate a connection. Specifically, the communication circuitry 52 that is part of the personal electronic device 14 acts as an energy supply to provide power to the inductively coupled reader tag 56 when the personal electronic device 14 is placed within proximity of the inductively coupled reader tag 56.

In an embodiment, the one or more common attributes include attributes such as, but not limited to, vehicle origin, functionality, or by the common entity that controls the fleet. In an embodiment, the vehicle origin includes one or more of the following: a make, a model, or mobility company that provides the autonomous software for the immediate vehicle. The functionality includes any possible feature that the immediate vehicle may include such as, for example, wireless charging, type of powertrain (e.g., if the immediate vehicle is a hybrid vehicle, etc.), type of prime mover (e.g., internal combustion engine, an electric vehicle (EV), etc.), type of drive system (e.g., two-wheel drive, all-wheel drive, four-wheel drive, front-wheel drive, rear wheel drive, and the like). The common entity that controls the fleet of vehicles may be any type of organization such as, but not limited to, a rental car company, a taxi or ride-sharing service, or the vehicle manufacturer. For example, a fleet may include all vehicles that are produced by General Motors Corporation.

The fleet-specific features of the vehicle 10 shall now be described. In an embodiment, the fleet-specific features include, but are not limited to, explanatory videos and information, statistics regarding automated miles driven for the particular make or manufacturer of the vehicle 10, cleaning and sanitization schedules, environmental responsibility statistics, and available accessibility features. The explanatory videos and information may include explanatory videos regarding automated driving vehicle technology. The statistics regarding automated incidents may include a number of automated miles driven, a number of automated hours in operation, and a number of automated rides completed. A number of incidences may indicate a number of incidences during daytime and number at nighttime, or a number of incidences with an animal/pedestrian/cyclist or another vehicle. The statistics may include an incident type that indicates how the vehicle 10 was stuck (e.g., striking object with front of vehicle, striking with side of vehicle by lane departure or during lane change, and/or striking with rear of vehicle while backing up).

The cleaning and sanitization schedules indicate how often and when a vehicle that is part of the fleet of vehicles is cleaned and sanitized. For example, the cleaning and sanitization schedule may indicate the last time a heating, ventilation, and air conditioning (HVAC) unit was sanitized to remove bacteria and germs, or when the interior surfaces of the vehicle 10 were last wiped down. The environmental responsibility statistics indicate how environmentally responsible the vehicle 10 is in energy consumption, greenhouses gases, and recyclability. For example, the environmental responsibility statistics may indicate which components of a vehicle are constructed at least in part from recycled materials. Finally, the available accessibility features refer to technology that may assist a user when operating a vehicle. For example, available accessibility features may support blind or vision-impaired individuals, hard of hearing or deaf individuals, individuals with motor or speech impediments, and individuals with cognitive impairments. One example of an accessibility feature is specialized knobs or a special touchscreen to accommodate an individual with unsteady or shaky hands. Another example of an accessibility feature is the ability to stream audio directly into an individual's hearing aid.

Referring generally to the figures, the disclosed system provides various technical effects and benefits by informing a user of one or more fleet-specific features of an immediate vehicle with only minimal effort required by an individual. Existing websites allow for an individual to enter a specific VIN to learn about the specific features and options, however, many individuals find it cumbersome to do so. The disclosed system may provide assurance to a user who is apprehensive of entering an unknown vehicle, such as a rented or shared vehicle, or a taxi.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for communicating fleet-specific features of a vehicle to one or more personal electronic devices, the system comprising:
one or more controllers in wireless communication with a centralized computer system including one or more databases for storing the fleet-specific features, the one or more controllers executing instructions to:
undergo a passive wireless interaction with the one or more personal electronic devices, wherein the passive wireless interaction involves determining the one or more personal electronic devices are located within a predefined proximity around the vehicle without human interaction; and
in response to undergoing the passive wireless interaction, transmit one or more fleet-specific features to the one or more personal electronic devices, wherein the one or more fleet-specific features are shared by a fleet of vehicles, wherein the fleet of vehicles include an immediate vehicle and a group of vehicles that share one or more common attributes.

2. The system of claim 1, wherein the passive wireless interaction includes establishing wireless communication between the one or more controllers and the one or more personal electronic devices based on a short-range communications protocol.

3. The system of claim 2, wherein the predefined proximity is a communication range of the short-range communications protocol that connects the one or more controllers and the personal electronic device to one another.

4. The system of claim 2, wherein the short-range communications protocol is set by the Institute of Electrical and Electronics Engineers, Inc. (IEEE) 802.xx standards.

5. The system of claim 1, wherein the one or more common attributes include one or more of the following: vehicle origin, functionality, and a common entity that controls the fleet of vehicles.

6. The system of claim 5, wherein the vehicle origin includes one or more of the following: a make, a model, or mobility company that provides autonomous software for the immediate vehicle.

7. The system of claim 1, wherein the passive wireless interaction includes sensing the vehicle and the personal electronic device are within the predefined proximity of one another based on proximity sensing.

8. The system of claim 1, wherein the proximity sensing includes:
receiving coordinates indicating a location of the one or more personal electronic devices;
determining a distance between the personal electronic device and the vehicle based on the coordinates of the personal electronic device; and
comparing the distance between the personal electronic device and the vehicle and the predefined proximity.

9. The system of claim 1, wherein the fleet-specific features include one or more of the following: explanatory videos and information, statistics regarding automated miles driven for a particular make or manufacturer of the vehicle, cleaning and sanitization schedules, environmental responsibility statistics, and available accessibility features.

10. A system for communicating fleet-specific features of a vehicle, the system comprising:
one or more personal electronic devices in wireless communication with a centralized computer system including one or more databases for storing the fleet-specific features, wherein the one or more personal electronic devices each include one or more controllers executing instructions to:
undergo an active wireless interaction with one or more information transmission objects, wherein the active wireless interaction involves determining the personal electronic device is located within a predefined proximity around the vehicle based on a deliberate action by an individual; and
in response to undergoing the active wireless interaction, the centralized computer system transmits one or more fleet-specific features to the one or more personal electronic devices, wherein the one or more fleet-specific features are shared by a fleet of vehicles, wherein the fleet of vehicles include an immediate vehicle and a group of vehicles that share one or more common attributes.

11. The system of claim 10, wherein the deliberate action is an individual scanning a symbol by a camera of a personal electronic device.

12. The system of claim 11, wherein the symbol identifies the fleet that includes the immediate vehicle.

13. The system of claim 11, wherein the symbol identifies a corresponding vehicle identification number (VIN) of the immediate vehicle.

14. The system of claim 11, wherein the symbol is disposed along an exterior or interior surface of the vehicle.

15. The system of claim 11, wherein the symbol is a decal disposed along a passenger window of the vehicle.

16. The system of claim 11, wherein the symbol is displayed by a screen located within an interior cabin of the vehicle.

17. The system of claim 10, wherein the deliberate action is placing a personal electronic device in proximity to an inductively coupled reader tag mounted on the vehicle to initiate a connection.

18. The system of claim 10, wherein the one or more common attributes include one or more of the following: vehicle origin, functionality, and a common entity that controls the fleet of vehicles.

19. The system of claim 18, wherein the vehicle origin includes one or more of the following: a make, a model, or mobility company that provides the autonomous software for the immediate vehicle.

20. The system of claim 10, wherein the fleet-specific features include one or more of the following: explanatory videos and information, statistics regarding automated miles driven for a particular make or manufacturer of the vehicle, cleaning and sanitization schedules, environmental responsibility statistics, and available accessibility features.

* * * * *